United States Patent
Gutz et al.

(10) Patent No.: US 7,882,116 B2
(45) Date of Patent: Feb. 1, 2011

(54) METHOD FOR LOCALIZATION OF PROGRAMMING MODELING RESOURCES

(75) Inventors: Steve John Gutz, Gloucester (CA); Kenneth Earle Hussey, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/131,991

(22) Filed: May 18, 2005

(65) Prior Publication Data
US 2006/0265207 A1 Nov. 23, 2006

(51) Int. Cl.
*G06F 17/30* (2006.01)
*G06F 9/44* (2006.01)
*G06F 17/20* (2006.01)

(52) U.S. Cl. ............... 707/756; 707/758; 704/8; 717/104

(58) Field of Classification Search ........ 704/8; 707/2, 158, 999.2, 999.158, 756, 758; 717/104
See application file for complete search history.

(56) References Cited

U.S. PATENT DOCUMENTS

| | | | | |
|---|---|---|---|---|
| 4,566,078 A * | 1/1986 | Crabtree | .......... | 704/8 |
| 4,595,980 A * | 6/1986 | Innes | .......... | 704/8 |
| 4,615,002 A * | 9/1986 | Innes | .......... | 704/8 |
| 5,201,042 A * | 4/1993 | Weisner et al. | .......... | 704/2 |
| 5,323,311 A * | 6/1994 | Fukao et al. | .......... | 704/2 |
| 5,416,903 A * | 5/1995 | Malcolm | .......... | 715/703 |
| 5,477,451 A * | 12/1995 | Brown et al. | .......... | 704/9 |
| 5,490,061 A * | 2/1996 | Tolin et al. | .......... | 704/2 |
| 5,510,981 A * | 4/1996 | Berger et al. | .......... | 704/2 |
| 5,583,761 A * | 12/1996 | Chou | .......... | 715/201 |
| 5,644,775 A * | 7/1997 | Thompson et al. | .......... | 704/7 |
| 5,678,039 A * | 10/1997 | Hinks et al. | .......... | 707/4 |
| 5,696,975 A * | 12/1997 | Moore et al. | .......... | 717/168 |
| 5,732,266 A * | 3/1998 | Moore et al. | .......... | 713/1 |
| 5,768,603 A * | 6/1998 | Brown et al. | .......... | 704/9 |
| 5,778,356 A * | 7/1998 | Heiny | .......... | 707/2 |
| 5,805,832 A * | 9/1998 | Brown et al. | .......... | 711/1 |
| 5,812,964 A * | 9/1998 | Finger | .......... | 704/7 |
| 5,884,247 A * | 3/1999 | Christy | .......... | 704/7 |
| 5,893,134 A * | 4/1999 | O'Donoghue et al. | | |
| 5,903,859 A * | 5/1999 | Stone et al. | .......... | 704/8 |
| 5,974,372 A | 10/1999 | Barnes et al. | | |

(Continued)

OTHER PUBLICATIONS

Davis, Mark E., et al., "Creating Global Software: Text Handling and Localization in Taligent's CommonPoint Application System", IBM Systems Journal, vol. 35, No. 2, © 1996, pp. 227-243.*

(Continued)

*Primary Examiner*—Robert Stevens
(74) *Attorney, Agent, or Firm*—Hamilton, Brook, Smith & Reynolds, P.C.

(57) ABSTRACT

A computer method localizes programming models. Given a model having one or more elements, each element has an element name, and each element name is in a language of an author of the model. For each element name, the invention method stores corresponding character strings (or string values) for generating the element name in different languages. During display of the given model in a certain locale, the present invention obtains the stored respective character strings of each element name in the language of the certain locale and uses the obtained character strings to display each element name in the language of the certain locale.

20 Claims, 5 Drawing Sheets

U.S. PATENT DOCUMENTS

| | | | | |
|---|---|---|---|---|
| 6,009,422 | A * | 12/1999 | Ciccarelli | 1/1 |
| 6,035,121 | A * | 3/2000 | Chiu et al. | 717/141 |
| 6,073,090 | A * | 6/2000 | Fortune et al. | 704/8 |
| 6,092,036 | A * | 7/2000 | Hamann | 704/8 |
| 6,092,037 | A * | 7/2000 | Stone et al. | 704/8 |
| 6,138,086 | A * | 10/2000 | Rose et al. | 704/8 |
| 6,275,978 | B1 * | 8/2001 | Bell | 717/143 |
| 6,314,469 | B1 * | 11/2001 | Tan et al. | 709/245 |
| RE37,722 | E * | 5/2002 | Burnard et al. | 713/1 |
| 6,446,133 | B1 * | 9/2002 | Tan et al. | 709/245 |
| 6,490,547 | B1 | 12/2002 | Atkin et al. | |
| 6,496,793 | B1 * | 12/2002 | Veditz et al. | 704/8 |
| 6,519,557 | B1 | 2/2003 | Emens et al. | |
| 6,526,426 | B1 * | 2/2003 | Lakritz | 715/536 |
| 6,530,039 | B1 * | 3/2003 | Yang | 714/38 |
| 6,623,529 | B1 * | 9/2003 | Lakritz | 715/205 |
| 6,631,500 | B1 * | 10/2003 | Kumhyr | 715/236 |
| 7,024,365 | B1 * | 4/2006 | Koff et al. | 704/270.1 |
| 7,089,494 | B1 * | 8/2006 | Burrell | 715/207 |
| 7,103,875 | B1 * | 9/2006 | Kaneko et al. | 717/125 |
| 7,149,971 | B2 * | 12/2006 | Mudusuru | 715/264 |
| 7,177,793 | B2 * | 2/2007 | Barker et al. | 704/8 |
| 7,389,474 | B2 * | 6/2008 | Rettig et al. | 715/263 |
| 2003/0009323 | A1 * | 1/2003 | Adeli | 704/8 |
| 2003/0055625 | A1 * | 3/2003 | Korelsky et al. | 704/9 |
| 2003/0126559 | A1 * | 7/2003 | Fuhrmann | 715/513 |
| 2003/0135360 | A1 * | 7/2003 | Barker et al. | 704/8 |
| 2003/0135661 | A1 * | 7/2003 | Barker et al. | 709/316 |
| 2003/0135665 | A1 * | 7/2003 | Barker et al. | 709/328 |
| 2003/0154069 | A1 * | 8/2003 | Carew et al. | 704/7 |
| 2003/0171911 | A1 * | 9/2003 | Fairweather | 704/2 |
| 2003/0200535 | A1 * | 10/2003 | McNamara | 717/137 |
| 2004/0172601 | A1 * | 9/2004 | Rettig et al. | 715/523 |
| 2004/0205118 | A1 * | 10/2004 | Yu | 709/203 |
| 2004/0205671 | A1 * | 10/2004 | Sukehiro et al. | 715/532 |
| 2004/0210444 | A1 * | 10/2004 | Arenburg et al. | 704/277 |
| 2004/0237044 | A1 * | 11/2004 | Travieso et al. | 715/530 |
| 2004/0268257 | A1 * | 12/2004 | Mudusuru | 715/536 |
| 2004/0268311 | A1 * | 12/2004 | Pizzoli et al. | 717/124 |
| 2004/0268371 | A1 * | 12/2004 | Carrell et al. | 719/330 |
| 2005/0050526 | A1 * | 3/2005 | Dahne-Steuber et al. | 717/136 |
| 2006/0150173 | A1 * | 7/2006 | McHugh et al. | 717/162 |
| 2007/0209031 | A1 * | 9/2007 | Ortal et al. | 717/104 |
| 2007/0225966 | A1 * | 9/2007 | Suen et al. | 704/9 |

OTHER PUBLICATIONS

Sakaguchi, Tetsuo, et al., "A Browsing Tool for Multi-lingual Documents for Users without Multi-lingual Fonts", DL '96, Bethesda, MD, © 1996, pp. 63-71.*

Boulos, Maged N. Kamel, "Location-based Health Information Services: A New Paradigm in Personalised Information Delivery", International Journal of Health Geographics, vol. 2, No. 2, Jan. 10, 2003, pp. 1-11.*

Lerner, Michael, "Building Worldwide Web Sites", IBM developerWorks, Sep. 1999, pp. 1-4.*

Powell, James, et al., "Multilingual Federated Searching Across Heterogeneous Collections", D-Lib Magazine, Sep. 1998, pp. 1-11.*

Barrett, Daniel J., et al., "Automated Support for Seamless Interoperability in Polylingual Software Systems", ACM SIGSOFT Software Engineering Notes, vol. 21, Issue 6, Nov. 1996, pp. 147-155.*

Perlman, Gary, "The FirstSearch User Interface Architecture: Universal Access for any User, in many Languages, on any Platform", CUU '00, Arlington, VA, © 2000, pp. 1-8.*

Sato, Satoshi, "CTM: An Example-Based Translation Aid System", Proc. of COLING-92, Nantes, France, Aug. 23-28, 1992, pp. 1259-1263.*

Simons, Gary F., et al., "Multilingual Data Processing in the CELLAR Environment", Summer Institute of Linguistics, Inc., © 1995, 40 pages.*

* cited by examiner

METHOD FOR LOCALIZATION OF PROGRAMMING MODELING RESOURCES

BACKGROUND OF THE INVENTION

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and/or service that addresses the problem. The UML syntax enables software designers to express (specify and document) the subject problems and solutions in a standardized manner, while the UML semantics enable knowledge about the subject system to be captured and leveraged during the problem solving phase. As such, the UML enables the sharing of information (including prior solution portions) and extension (without reimplementation) of core object oriented concepts (analysis and design) during the iterative problem-solving process for designing software products.

Resources for UML2, such as models and profiles, are inherently locked to a single user language. The UML2 specification makes no efforts to describe the management of locale-specific strings. As a result there is no way to share resources with users who speak other languages without manually translating the resource content.

SUMMARY OF THE INVENTION

The present invention addresses the problems of the prior art. The present invention provides a computer method, apparatus and code carrying product for localizing programming models.

Given a model having one or more elements, each element having an element name and each element name being in a language of an author of the model, for each element name, the present invention stores corresponding character strings (or string values) for generating the element name in different languages. During display of the given model in a certain locale, the present invention obtains respective character strings of each element name in the language of the certain locale, and uses the obtained character strings to display each element name in the language of the certain locale.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
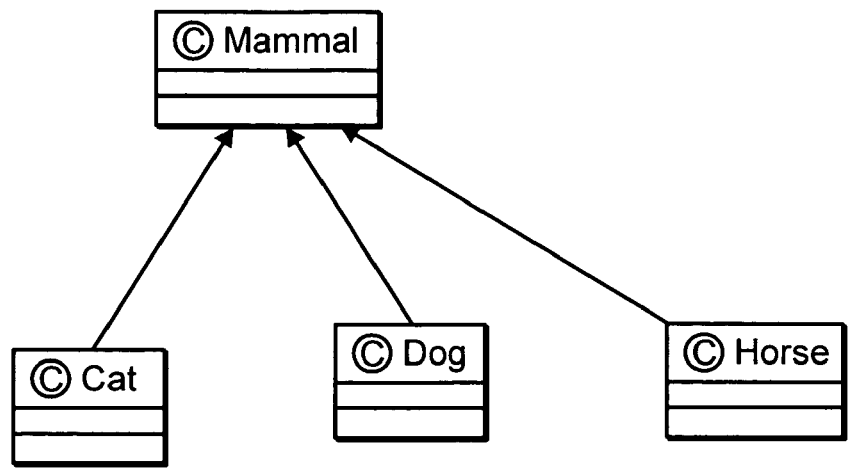
FIG. 1a is a schematic illustration of a UML2 model displaying strings in English.

Consider the following simple UML2 model 10 illustrated in FIG. 1a. Regardless of where in the world this model 10 is opened, it will display English strings. This is a big limitation for multinational corporations (like IBM) where they can conceivably have employees who do not speak the same language (natural language) as the resource author.

To solve the foregoing problem, Applicants have developed a technique that allows the resource author to associate a set of locale-specific string tables to any kind of UML2 resource. This provides some key competitive advantages over currently available offerings:

1. Models and Profiles can easily be localized without manual translation of individual elements. Translations can be performed in bulk by creating separate units containing the string information for each support language.

2. No code changes are required to localize resources. The system defined locale is used to locate the locale-specific strings for any element in the resource.

3. Resources and user readable strings are separated and can reside within the same component or within any external component fragment. The process to translate simple string tables is proven and does not require translators to understand the resource format or the tool that created it.

4. Localized presentation of the resource occurs transparently. From the user's perspective the model has been created in his own language.

Figure 2:
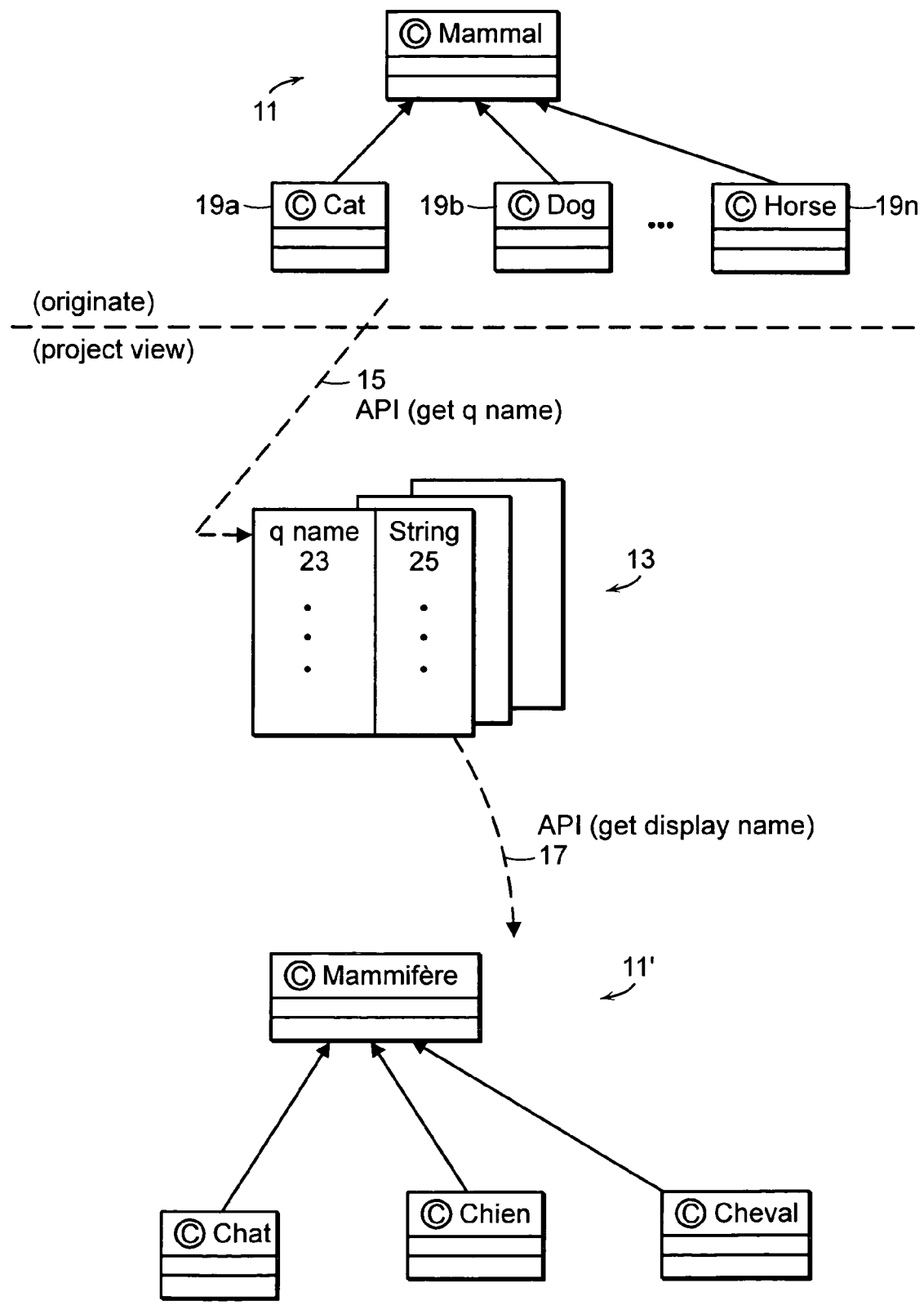
FIG. 2 is a block diagram of one embodiment of the present invention.

The present invention utilizes an API 15 that returns the qualified name and an API 17 that returns the element's "display name" (APIs 15, 17 in FIG. 2). In a preferred embodiment, the present invention augments these API's 15, 17 to optionally extract information from string tables. Illustrated in FIG. 2, a subject model 11 is paired with a set of property files 13 containing "qualified name" 23="string value" 25 pairs. The "string value" 25 is the display string (a character string) and can originate from a localized form and thus be in a local desired language. For purposes of illustration and not limitation, model 11 is shown to be formed of elements 19a, b . . . n.

The project containing the resource (UML2 model 11) then contains a set of language strings 13 for every supported language. In one embodiment, these language strings are stored as property files 13. In Java and other language embodiments, the language strings may be internal representations. In other embodiments, the language strings may be represented by other notions and/or techniques.

Exemplary/form of the preferred embodiment property file (language strings) 13 is:

Project:
  mammals.nnx (arbitrary model file)
  mammals.properties (the default language)
  mammals_fr.properties
  mammals_jp.properties
  mammals_it.properties These support the French, Japanese and Italian languages, for example. Other languages are similarly supportable.

UML2 defines the "name" property for any NamedElement in the resource 11, but this is a fixed value defined in the language of the author of the model 11 of model element 19. The invention effectively adds a new method (illustrated in FIG. 2) to display a localized name for a model element 19. That is, given a model 11 that originated in one language, the present invention at the project side employs the API method 15 to obtain the qualified name 23 of an element 19 of model 11. The present invention uses the obtained qualified name 23 to look up (via API method 17) in local property file 13, a corresponding display string/string value 25 which is in a different language than the originating language of the model 11.

The present invention uses the corresponding string value 25 (different language) as the element's 19 display name in the project environment side. The display name for any element 19 is shown in the user interface any time the user is presented with a diagram or property sheet containing that element, and is always rendered in the language of the viewer.

To ensure uniqueness of the localized information, the qualified name 23 for the element 19 is used as a key to look-up string values 25 in the associated property files 13. The qualified name 23 for a UML2 element has the form:
<resource>::<package1>:: . . . ::<package n>::<element parent>::<element name>

For example:
Animals::Mammals::Cat::hairLength

This describes the qualified name for the "hairLength" property owned by the Cat class which itself is owned by a Mammals package in the Animals model.

Assuming the model 10 from FIG. 1a is named "Mammals", the French string table 13 (mammals_fr.properties) would contain:
Mammals_Mammal=Mammifère
Mammals_Cat=Chat
Mammals_Dog=Chien
Mammals_Horse=Cheval Note, In embodiments where property names cannot contain special characters such as ":" separators in the path are converted to "_" characters. Other separator characters are suitable.

Figure 3:
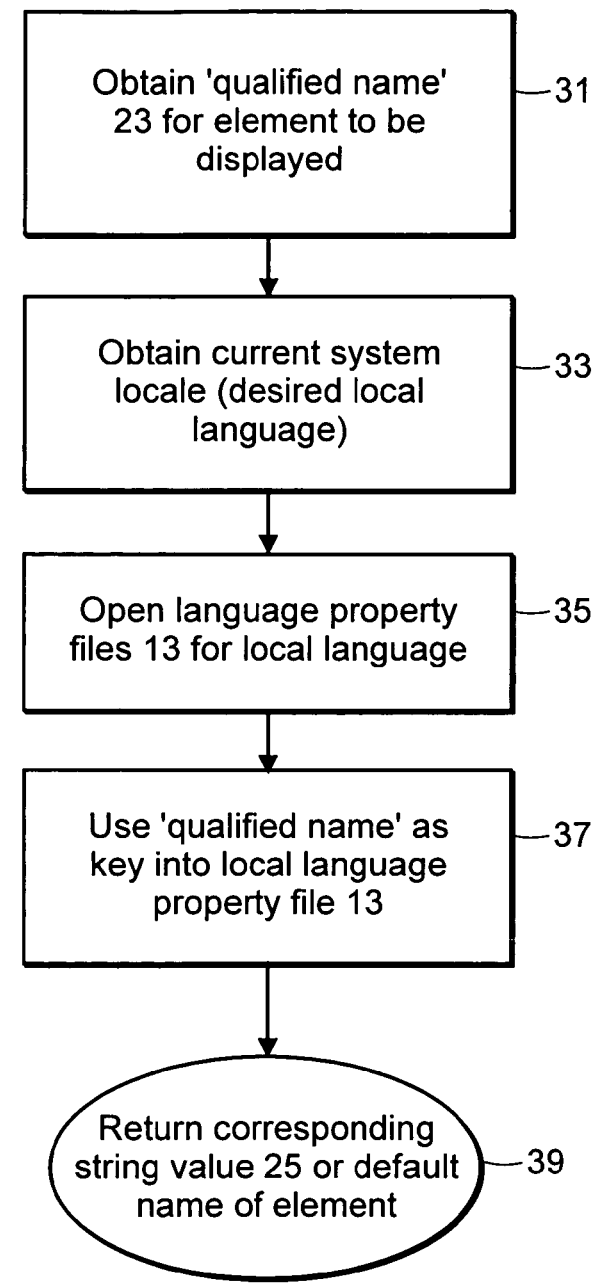
FIG. 3 is a flow diagram of the embodiment of FIG. 2.

When obtaining the display name for any given element 19 of a model 11, the present invention uses the following algorithm or process 21 as illustrated in FIG. 3:

In step 31, process 21, obtains the qualified name 23 for the subject/to-be-displayed model element 19.

In step 33, process 21, obtains the current system locale (and hence desired local language).

Next, step 35 opens the language properties (property files 13) specified for the desired language.

Step 37 attempts to load the string value 25 for the qualified name 23 key. That is, step 37 uses the qualified name 23 obtained in step 31 as a key in lookup table/property file 13 opened in step 35 and obtains from opened property file 13 the local language display string/string value 25 corresponding to the subject qualified name 23.

If the string 25 is located, step 39 returns the corresponding string value 25. If the string 25 is not found, then step 39 returns the default name defined in the model element 19 when the resource author created the element.

Figure 1B:
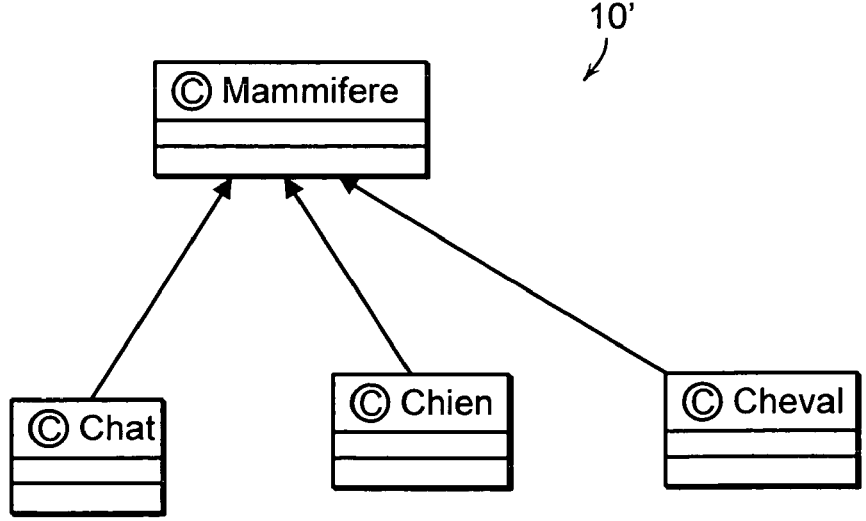
FIG. 1b is a schematic illustration of the UML2 model of FIG. 1a in French utilizing the present invention.

The result is a localized model 11' (FIG. 2) that is completely transparent to the end user. Returning to the example in FIG. 1a, when opened by a user on a French computer, the model 10 from FIG. 1a will display in the French language model 10' as shown in FIG. 1b.

Through extensions to the UML2 APIs and enhancements to the Aurora tool set and the UML2 open source, Applicants have added a powerful mechanism for authors of UML2 resources to provide localization to their models and profiles. No other method or system currently supports this capability, or offers the same kind of transparency.

Figure 4:
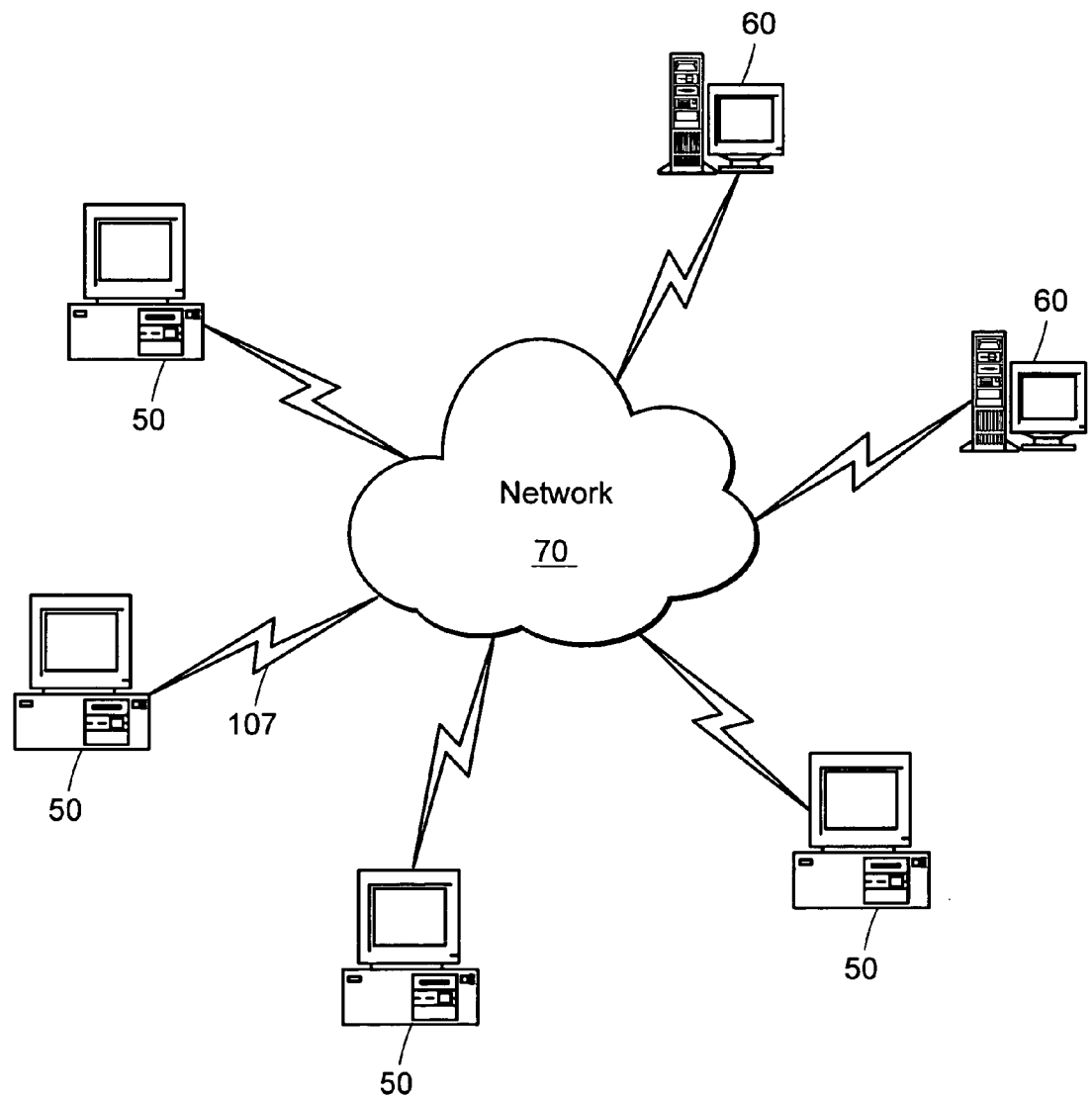
FIG. 4 is a computer network environment in which embodiments of the present invention may be employed.

For added clarity and completeness in describing the present invention, FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
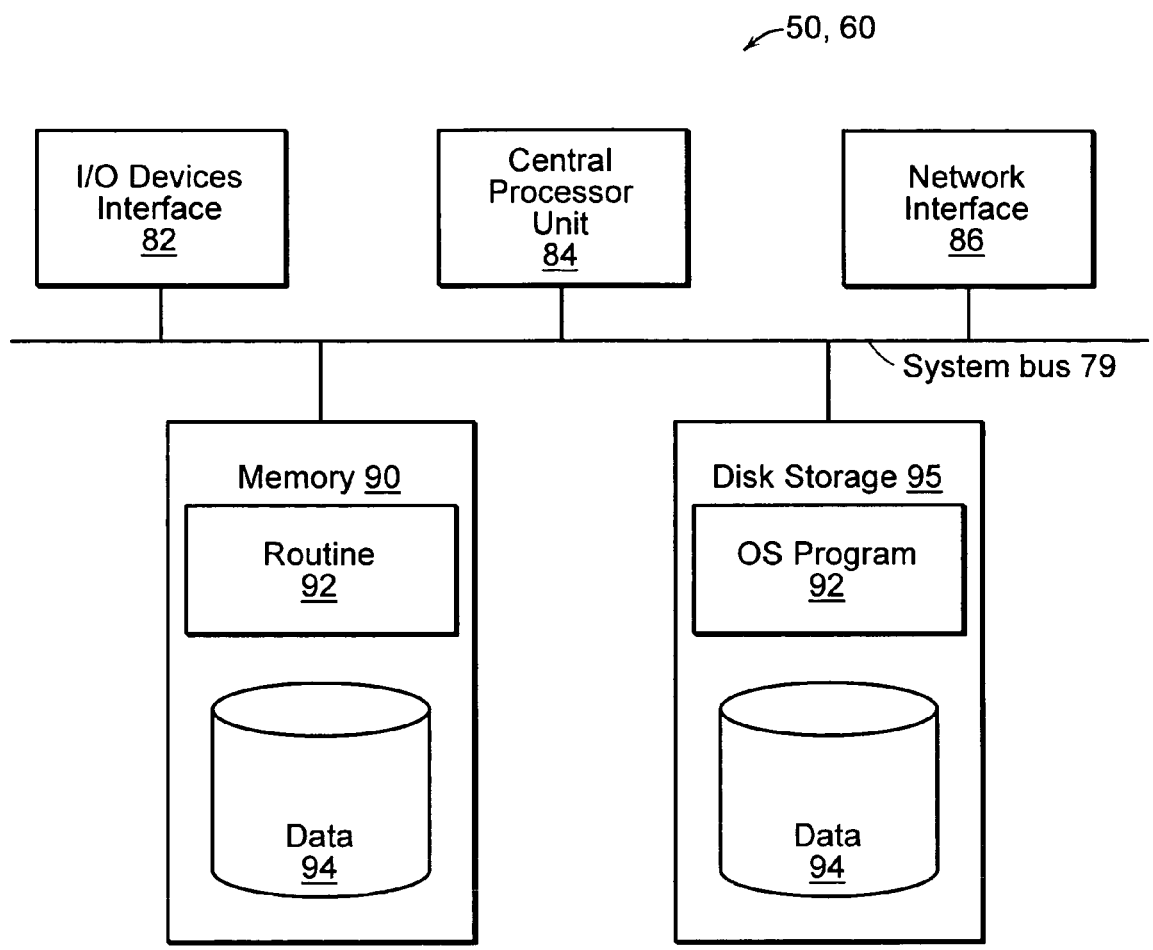
FIG. 5 is a block diagram of the internal structure of a processor/computer node in the network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., model 11, property files 13 and processor method 21 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 4 and 5 are for purposes of illustration and not limitation of the present invention.

Further, property files 13 may be implemented as lookup tables in one embodiment and other qualified name-string value pair handling data structures in other embodiments.

What is claimed is:

1. A computer method for localizing programming models, comprising the steps of:
    given a programming model having one or more elements, each element having an element name and each element name being in a language spoken by an author of the programming model, for each element name, (a) pairing the element name to corresponding character strings for generating the element name in different languages resulting in element name-character string pairs, and (b) storing the resulting pairs in a set of property files of the model, there being a different property file for each of the different languages; and
    during display of the given programming model in different geographic locales, for each of the different geographic locales:
        (i) obtaining local system defined geographic locale,
        (ii) using the obtained local system defined geographic locale, locating respective character strings of each element name by opening the property file of the language corresponding to the obtained local system defined geographic locale and looking up the element name-character string pairs in the opened property file, the character strings being in the respective language spoken in the obtained local system defined geographic locale and free of user specification of the respective spoken language, said locating including obtaining the respective character strings of each element name in the respective spoken language of the local system defined geographic locale, and
        (iii) using the obtained character strings to display each element name in the respective language spoken in the obtained local system defined geographic locale in a manner free of manual translation across the different geographic locales and in a manner free of code changes, wherein said locating and obtaining respective character strings is automatically performed as a function of the local system defined geographic locale and not as a function of user specified spoken language to use.

2. A computer method as claimed in claim 1 wherein the step of storing includes employing property files for storing element name-character string pairs.

3. A computer method as claimed in claim 2 wherein the element name is in a qualified manner in the element name-character string pairs.

4. A computer method as claimed in claim 1 wherein the step of obtaining includes calling a get element name API.

5. A computer method as claimed in claim 1 wherein the step of using includes calling a get display name API.

6. A computer method as claimed in claim 1 wherein the different languages include any of French, Japanese, Italian, English, German and Russian.

7. Computer apparatus for localizing programming models, comprising:
    given a programming model having one or more elements, each element having an element name initially in a language spoken by an author of the programming model, a storage device storing a set of property files of the model, a different property file for different languages, for each element name, (a) the element name being paired to corresponding string values for generating the element name in different languages resulting in element name-string value pairs, and (b) the resulting pairs being stored in the different language property files according to language; and
    a display process having access to the storage device and implemented by a digital processor system such that during display of the given programming model in different geographic locales, the display process for each of the different geographic locales:
        (i) obtains local digital processor system defined geographic locale,
        (ii) uses the obtained local system defined geographic locale to (a) open the property file of the language corresponding to the obtained local system defined geographic locale, (b) look up the element name-string value pairs in the opened property file and (c) locate and obtain respective string values of each element name in the respective language spoken in the obtained local system defined geographic locale and free of user specification of spoken language for that locale, and
        (iii) using the obtained string values, displays each element name in the respective language spoken in the obtained local system defined geographic locale in a manner free of manual translation of the element names across the different geographic locales and in a manner free of code changes, wherein the display process locating and obtaining respective string values is automatically performed as a function of the obtained local digital processor system defined geographic locale and not as a function of user specified spoken language to use.

8. Computer apparatus as claimed in claim 7 wherein the storage device includes property files for storing element name-string value pairs.

9. Computer apparatus as claimed in claim 8 wherein the element name is in a qualified manner in the element name-string value pairs.

10. Computer apparatus as claimed in claim 9 wherein the display process utilizes a get qualified name API and a get display name API.

11. Computer apparatus as claimed in claim 7 wherein the different languages include any of French, Japanese, Italian, English, German and Russian.

12. A computer program product for localizing programming models, the computer program product comprising a computer readable storage medium having computer readable program code embodied therewith and controlling a processor to:

given a programming model having one or more elements, each element having an element name and each element name being in a language spoken by an author of the programming model, for each element name, (a) pair the element name to corresponding character strings configured to generate the element name in different languages resulting in element name-character string pairs, and (b) store the resulting pairs in a set of property files of the model, a different property file for different languages; and during display of the given programming model in different geographic locales, for each of the different geographic locales: (i) obtain local processor system defined geographic locale, (ii) use the obtained local system defined geographic locale to (a) open the property file of the language corresponding to the obtained local system defined geographic locale, (b) look up the element name-character string pairs in the opened property file and (c) locate and obtain respective character strings of each element name in the respective language spoken in the obtained local system defined geographic locale and free of user specification of spoken language for that locale, and (iii) use the obtained character strings to display each element name in the respective language spoken in the obtained local system defined geographic locale in a manner free of manual translation across the different geographic locales and in a manner free of code changes, wherein said locating and obtaining respective character strings is automatically performed as a function of the obtained local system defined geographic locale and not as a function of a user specified spoken language.

13. A computer program product as claimed in claim 12 wherein the step of storing includes employing property files for storing element name-character string pairs.

14. A computer program product as claimed in claim 13 wherein the element name is in a qualified manner in the element name-character string pairs; and the step of obtaining respective character strings includes calling a get qualified element name API.

15. A computer program product as claimed in claim 12 wherein the step of using includes calling a get display name API.

16. A computer program product as claimed in claim 12 wherein the different languages include any of French, Japanese, Italian, English, German and Russian.

17. A computer system for localizing programming models, comprising:

given a programming model having one or more elements, each element having an element name initially in a language spoken by an author of the programming model, storage means for storing a set of property files of the model, a different property file for different languages, for each element name, (a) the element name being paired to corresponding string values generating the element name in different languages resulting in element name-string value pairs, and (b) the resulting pairs being stored in the different language property files according to language; and display means coupled to access the storage means and for generating display of each element name in a respective language of different geographic locales, by:

for each of the different geographic locales, (i) obtaining local system defined geographic locale, (ii) using the obtained local system defined geographic locale, (a) opening the property file of the language corresponding to the obtained local system geographic locale, (b) looking up the element name-string value pairs in the opened property file, and (c) obtaining the respective string values of each element name in the respective language spoken in the obtained local system defined geographic locale and free of user specification of spoken language to use, and (iii) using the obtained string values, displaying each element name in the respective language spoken in the obtained local system defined geographic locale in a manner free of manual translation of the element names across the different geographic locales, and a manner free of code changes, wherein obtaining from the storage means includes locating the respective string values automatically as a function of the obtained local system defined geographic locale and not as a function of a user specified language preference.

18. A computer system as claimed in claim 17 wherein the storage means includes property files for storing element name-string value pairs.

19. A computer system as claimed in claim 17 wherein the display means calls at least one of a get element name API and a get display name API.

20. A computer system as claimed in claim 17 wherein the different languages include any of French, Japanese, Italian, English, German and Russian.

* * * * *